(12) United States Patent
McKay et al.

(10) Patent No.: US 6,235,671 B1
(45) Date of Patent: May 22, 2001

(54) HETEROGENEOUS METALLOCENE CATALYST

(75) Inventors: Ian McKay, Calgary; Alison Ciupa, Chestermere; P. Scott Chisholm, Calgary, all of (CA)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 09/292,039

(22) Filed: Apr. 14, 1999

(30) Foreign Application Priority Data

May 8, 1998 (CA) .................................................. 2237231

(51) Int. Cl.$^7$ .............................. B01J 31/00; B01J 37/00; C08F 4/02; C08F 4/60
(52) U.S. Cl. ........................... 502/110; 502/132; 502/133
(58) Field of Search ..................................... 502/110, 132, 502/133

(56) References Cited

U.S. PATENT DOCUMENTS

| | | |
|---|---|---|
| 2,827,466 | 3/1958 | Stack . |
| 3,231,550 | 1/1966 | Manyik . |
| 4,284,762 | 8/1981 | Miyato et al. . |
| 4,347,353 | 8/1982 | Miyata et al. . |
| 4,542,199 | 9/1985 | Kaminsky et al. . |
| 4,543,399 | 9/1985 | Jenkins, II et al. . |
| 4,548,916 | * 10/1985 | Baker .................................. 502/132 |
| 4,752,597 | 6/1988 | Turner . |
| 4,808,561 | 2/1989 | Welborn, Jr. . |
| 5,352,749 | 10/1994 | De Chellis et al. . |
| 5,648,310 | 7/1997 | Wasserman et al. . |
| 5,650,464 | 7/1997 | Brunner et al. ...................... 524/100 |
| 5,672,669 | 9/1997 | Wasserman et al. . |
| 5,674,795 | 10/1997 | Wasserman et al. . |
| 5,703,149 | 12/1997 | Rotzinger et al. .................... 526/193 |

FOREIGN PATENT DOCUMENTS 60-257837 * 12/1985 (JP) ...................................... 502/132

* cited by examiner

Primary Examiner—Mark L. Bell
Assistant Examiner—J. Pasterczyk
(74) Attorney, Agent, or Firm—Kenneth H. Johnson

(57) ABSTRACT

A heterogeneous catalyst for olefin polymerization is prepared by spray drying a mixture of a metallocene catalyst, a cocatalyst and a hydrotalcite. It Preferred hydrotalcites are magnesium-aluminum hydroxy carbonates. The catalysts are very active for ethylene polymerization. The hydrotalcite used in this invention are generally defined by the formula:

$$(Mg_{1-x}Al_x(OH)_2)^{n+}A^{n-}_{x/n} \cdot m\, H_2O$$

wherein X is from 0 to 0.5, m is from 0 to 20 and $A^{n-}$ is an anion having a charge of n. Preferred hydrotalcites are those in which the anion A is a carbonate and which have been dried of adsorbed water.

12 Claims, No Drawings

HETEROGENEOUS METALLOCENE CATALYST

FIELD OF THE INVENTION

This invention relates to a heterogeneous catalyst polymerization of ethylene and the copolymerization of ethylene with lower alpha olefins such as butene-1; propylene; isobutylene; hexene-1; 4-methyl pentene-1; and octene. The invention further relates to an ethylene polymerization process which employs the catalyst.

BACKGROUND OF THE INVENTION

The use of "metallocene" catalysts (i.e. catalysts which contain two cyclopentadienyl ligands) for the polymerization of ethylene has been investigated for some 40 years, as evidenced by a series of patents which include U.S. Pat. No. 2,827,466 (Breslow, from a filing date of Sep. 27, 1955); U.S. Pat. No. 3,231,550 (Manyik, from a filing date of Jun. 4, 1964); and U.S. Pat No. 4,542,199 (Kaminsky et al). Kaminsky et al discovered that certain alumoxanes may activate zirconium-based metallocenes in a manner that produces a "single site" catalyst with spectacular productivity—a significant discovery which led to a large increase in research in this area of catalysis. Of additional relevance to the present invention, much investigation has been done on monocyclopentadienyl transition metal catalysts which are sometimes also referred to as "pseudometallocenes".

When a metallocene or a pseudometallocene catalyst is employed in a slurry or gas phase polymerization, it is highly preferred to use the catalyst in a heterogeneous or "supported form". It is also highly preferred that the catalyst does not cause reactor fouling. The art of preparing heterogeneous catalysts which do not lead to reactor fouling is not adequately understood, though it is generally accepted that the catalytic material should be very well anchored to the support so as to reduce the incidence of fouling resulting from the deposition of catalyst or cocatalyst which has dissociated from the support.

In general, heterogeneous metallocene catalysts may be grouped into three main categories:

I. Unsupported Alumoxane/Metallocene Mixtures

These catalysts may be easily prepared by evaporating the solvent or diluent from a liquid mixture of an alumoxane and a metallocene. The resulting product is a solid at room temperature due to the comparatively high molecular weight of the alumoxane. There are two disadvantages to this approach, namely cost (i.e. alumoxanes are comparatively expensive—and the alumoxane is used as an expensive "support" material) and "reaction continuity/fouling" (i.e. the alumoxane may partially melt under polymerization conditions, leading to reactor instability/fouling). U. S. Pat. No. (USP) 4,752,597 (Turner, to Exxon) illustrates this approach for the preparation of a heterogeneous metallocene catalyst.

II. Metal Oxide Supported Catalysts

These catalysts are prepared by depositing the metallocene catalyst and a cocatalyst on a very porous metal oxide support. The catalyst and cocatalyst are substantially contained within the pore structure of the metal oxide particle. This means that a comparatively large metal oxide particle is used (typically particle size of from 40 to 80 microns). The preparation of this type of supported catalyst is described in U.S. Pat. No. 4,808,561 (Welborn, to Exxon).

III. Filled/Spray Dried Catalysts U.S. Pat. Nos. 5,648,310; 5,674,795 and 5,672,669 (all to Union Carbide) teach the preparation of a heterogeneous metallocene catalyst by spray drying a mixture which contains a metallocene catalyst, a cocatalyst and a "filler" which is characterized by having a very small particle size (less than one micron) and by being unreactive with the catalyst and cocatalyst. The examples illustrate the use of very fine particle size "fumed" silica which has been treated to reduce the concentration of surface hydroxyls. The resulting catalysts exhibit good productivity. Moreover, they offer the potential to provide a catalyst which is not prone to "hot spots" (as the catalyst may be evenly distributed, at low concentration, throughout the heterogeneous matrix). However, these catalysts suffer from the potential disadvantage of being very friable because they are prepared with a fine, "inert" filler material which does not react with I anchor to the catalyst or cocatalyst.

Friable catalyst particles lead to the formation of "fines" in the polyethylene product, and may also aggravate reactor fouling problems.

It is one object of the present invention to provide a spray dried, heterogeneous metallocene catalyst which mitigates problems associated with prior art catalysts.

SUMMARY OF THE INVENTION

In one embodiment, the present invention provides a process to prepare a spray dried olefin polymerization catalyst, said process consisting of:

I) providing a mixture of:
  (a) an organometallic complex of a group 3–10 metal having at least one cyclopentadienyltype ligand;
  (b) an activator;
  (c) a hydrotalcite of the formula:

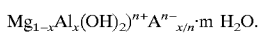

$$Mg_{1-x}Al_x(OH)_2)^{n+}A^{n-}_{x/n} \cdot m\ H_2O.$$

wherein $0 < x \leq 0.5$; m is a positive number, and $A^{n-}$ is an anion having a valence of n; and
  (d) a diluent; and II) spray drying said mixture.

DETAILED DESCRIPTION

An essential feature of the present invention is the use of a hydrotalcite as the filler material. Hydrotalcites are well known articles of commerce which are used in the polypropylene business to neutralize metal chloride residues from Ziegler-Natta catalysts—see for example U.S. Pat. Nos. 4,284,762 and 4,347,353. Such hydrotalcites are defined in these patents by the formula:

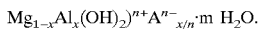

$$Mg_{1-x}Al_x(OH)_2)^{n+}A^{n-}_{x/n} \cdot m\ H_2O.$$

wherein $0 < x \leq 0.5$; m is a positive number; and $A^{n-}$ represents an anion having a valence of n.

The hydrotalcites are further described by having:
  (i) a BET specific surface area of not more than 30 m²g, preferably not more than 20 m²g (where m refers to meter and g to gram); and
  (ii) an average secondary particle size of not more than 5 microns and preferably (iii) a crystallite size, in the <003> direction determined by x-ray diffraction method, of at least 600 Å, preferably at least 1000 Å.

The anion ("$A^{n-}$") may be, for example, a carbonate, sulfate or phosphate. Hydrotalcites having a carbonate anion are commercially available, convenient to use, and hence are preferred for use in the present invention. These hydrotalcites are sometimes referred to by those skilled in the art as "magnesium aluminum hydroxy carbonates". Some commercially available hydrotalcites which are suitable for the present invention may be treated with a surfactant as disclosed in the aforementioned U.S. Pat Nos. 4,347,353 and 4,284,762.

In a commonly assigned patent application, the use of hydrotalcite to deactivate a Ziegler-Natta catalyzed solution polymerization process is disclosed. While not wishing to be bound by any particular theory, it is believed that the hydrotalcite reacts with metal chlorides in a manner which isolates the metal chloride in the hydrotalcite structure. In the case of Ziegler-Natta catalyzed polymerizations, this has been observed to deactivate the metal chloride sufficiently to stop polymerizations and mitigate problems which may otherwise be caused by metal chloride residues in the product. However, in direct contrast, the heterogeneous hydrotalcite/metallocene system of this invention is a highly active catalyst.

Metallocene

The catalyst used in this invention is an organometallic complex of a group 3–10 metal which is characterized by having at least one cyclopentadienyl ligand. Such catalysts are well known to those skilled in the art and are generally referred to as "metallocenes" or "pseudo" metallocenes ("true" metallocene complexes are bis-cyclopentadienyl complexes; "pseudo" complexes contain only one cyclopentadienyl ligand). These catalysts are so well known to those skilled in the art that a lengthy description of them herein is considered unnecessary.

Preferred metallocenes for use in the present invention are those which contain a group 4 organometallic complex selected from titanium, zirconium or hafnium.

Particularly preferred catalysts are those defined by the formula:

wherein M is a group 4 metal selected from titanium, zirconium and hafnium; Cp is a cyclopentadienyl-type ligand selected from the group consisting of unsubstituted cyclopentadienyl; substituted cyclopentadienyl; unsubstituted indenyl and substituted indenyl; and each X is independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals; and Pl is a phosphinimine ligand defined by the formula:

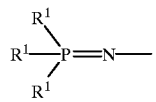

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, an amido radical of the formula:

wherein $R^2$ is as defined above, and a germanyl radical of the formula:

wherein $R^2$ is as defined above.

The term "cyclopentadienyl-type ligand" is meant to convey its conventional meaning—i.e. a closed ring ligand which is bonded to the metal via a delocalized pi-bond. The term includes the simple $C_5H_5$ ligand (unsubstituted cyclopentadienyl), substituted cyclopentadienyl ligands (in which one or more of the carbon atoms in the ring is substituted (with, for example, a $C_{1-10}$ hydrocarbyl radical, an alkoxy radical, a halide, a silyl or a phosphido), an unsubstituted indenyl ligand or an indenyl ligand in which one or more of the carbon atoms is substituted in a manner as described directly above.

The invention also requires a catalyst activator.

The activator may be selected from the group consisting of:

(i) an alumoxane; and (ii) an activator capable of ionizing the catalyst (an "ionic activator").

The alumoxane activator may be of the formula:

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") is the preferred alumoxane.

Activation with alumoxane generally requires a molar ratio of aluminum in the activator to (group 4) metal in the catalyst from 20:1 to 1000:1. Preferred ratios are from 50:1 to 250:1.

The activator capable of ionizing the catalyst may be selected from the group consisting of:

(i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and iii) compounds of the formula $B(R^7)_3$ wherein $R^7$ is as defined above.

In the above compounds preferably $R^7$ is a pentafluorophenyl radical, $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more $L^1$ ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra (o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra (o-tolyl)boron
N,N-direthylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron
di-(isopropyl)ammonium tetra(pentafluorophenyl)boron,
dicyclohexylammonium tetra (phenyl)boron
triphenylphosphonium tetra)phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenykris-pentafluorophenyl borate,
triphenylmethylium phenyltrisspentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-tnifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include:
N,N- dimethylaniliumtetrakispentafluorophenyl borate;
triphenylmethylium tetrakispentafluorophenyl borate; and
trispentafluorophenyl boron.

The heterogeneous catalyst compositions of this invention are particularly suitable for use in a slurry polymerization process or a gas phase polymerization process.

A typical slurry polymerization process uses total reactor pressures of up to about 50 bars and reactor temperatures of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

The gas phase process is preferably undertaken in a stirred bed reactor or a fluidized bed reactor. Fluidized bed reactors are most preferred and are widely described in the literature. A concise description of the process follows.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then recirculated through the polymerization zone, together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant—and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid should not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may also be employed. The present invention is similar with respect to choice of monomers.

Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbomene, alkyl-substituted norbornenes, alkenyl-substituted norbomenes and the like (e.g. 5-methylene-2-norbornene and 5-ethylidene-2-norbomene, bicyclo-(2,2, 1)-hepta-2,5-diene).

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having a density from about 0.910 to 0.935 g/cc or high density polyethylene having a density above 0.935 g/cc. The present invention might also be useful to prepare polyethylene having a density below 0.910 g/cc—the so-called very low and ultra low density polyethylenes.

The present invention may also be used to prepare co- and terpolymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The heterogeneous catalyst of this invention may also be used in a solution polymerization process.

Solution polymerization processes are well known in the art. These processes are conducted in the presence of an inert hydrocarbon solvent typically a $C_{5-12}$ hydrocarbon which may be unsubstituted or substituted by $C_{1-4}$ alkyl group, such as pentane, hexane, heptane, octane, cyclohexane, methylcyclohexane and hydrogenated naphtha. An additional solvent is Isopar E ($C_{8-12}$ aliphatic solvent, Exxon Chemical Co.).

The polymerization may be conducted at temperatures from about 80° C. to about 250° C. Depending on the product being made this temperature may be relatively low such as from 80° C. to about 180° C. for some of the ethylene propylene polymers and ethylene diene monomer polymers, to temperatures from about 120° C. to about 250° C. for the more convention polyethylenes, and copolymers of ethylene and styrene. The pressure of reaction may be as high as about 15,000 psig for the older high pressure processes or may range from about 100 to 4,500 psig.

Further details are illustrated in the following non-limiting examples.

EXAMPLES

Catalyst Preparation

Example 1

A supply of a commercially available hydrotalcite (a magnesium-aluminum hydroxy carbonate, sold as DHT-4A by Kyowa Chemical Industry Co.) was dried overnight in an oven at 180° C. to remove physically adsorbed moisture. 7.2 g of DHT-4A was placed in a 300 mL, 3-necked, round bottom flask, equipped with a magnetic stir bar and stirrer and gas inlet and outlet adapters. Nitrogen flow was introduced into the apparatus which was subsequently degassed for 30 minutes. In a separate, degassed hypovial, 10.3 mL of a 12.9 weight % Al solution of a commercially available methylalumoxane (sold as PMAO-IP by Akzo-Nobel) was combined with 40 mL of dry, degassed toluene to dilute the PMAO-IP solution. In a glovebox, under inert atmosphere, 0.167 g of Indenyl(tri-(t-butyl)phosphinimido)titanium dichloride, [(Ind)(tBu$_3$PN)TiCl$_2$]*, was placed in a hypovial which was then capped. 30 mL of dry, degassed toluene was subsequently introduced into this hypovial to dissolve the catalyst complex. 76 mL of dry, degassed toluene was added to the 300 mL flask to slurry the DHT-4A. Thereafter, the diluted PMAO-IP solution was slowly added to the synthetic hydrotalcite slurry at room temperature over a period of approximately 15 minutes. Once this addition was completed the resulting slurry was stirred for an additional 20 minutes. The solution of catalyst complex in toluene was then added to the PMAO-IP/DHT-4A slurry over a period of approximately 5 minutes, after which the catalyst slurry was left stirring at room temperature prior to spray drying. Recipe information is summarized in Table 1.

The above catalyst slurry was spray dried into a powdered form using a modified, Buchi 190 nozzle type, spray drying apparatus, equipped with a knock out pot to remove over-sized catalyst particles and a removable collection flask for the spray-dried catalyst material. Inlet and outlet temperatures and drier nitrogen flow rate for the spray drying are presented in Table 1.

Example 2

The catalyst of this example was prepared in essentially the same fashion as that for Example 1, with one exception being that the order of addition of the PMAO-IP solution and catalyst complex solution to the DHT-4A slurry was reversed. In this instance the catalyst solution was first added to the DHT-4A slurry followed by subsequent addition of the PMAO-IP solution. Recipe information and spray drying conditions are summarized in Table 1.

Example 3 (Comparative)

The catalyst of this example was prepared according to the procedure in Example 1, with the exception that the DHT-4A was not previously dried overnight to remove physically adsorbed moisture. The order of addition of PMAO-IP and catalyst solution was the same as for Example 1. In this instance, addition of PMAO-IP to the DHT-4A slurry was accompanied by noticeable gas evolution and heat generation. Recipe information and spray drying conditions are summarized in Table 1.

TABLE 1

Preparation of Spray-Dried Catalysts

| Catalyst | A | B | C |
|---|---|---|---|
| Example | 1 | 2 | 3 |
| DHT-4A (g) | 7.2 | 4.3 | 4.3 |
| [(Ind)(tBu$_3$PN)TiCl$_2$](g) | 0.167 | 0.100 | 0.100 |
| PMAO-IP, 12.9 weight % Al (mL) | 10.3 | 6.2 | 6.2 |
| Toluene, total volume (mL) | 146 | 87.6 | 87.6 |
| Spray drier, inlet temperature (° C.) | 214 | 198–210 | 200–213 |
| Spray drier, outlet temperature (° C.) | 118 | 111–120 | 111–117 |
| Spray drying N$_2$ flow rate (m$^3$/hr) | 14.2 | 14.3 | 14.1 |

Polymerization Trials

Polymerizations were conducted in a 2.2 L, autoclave reactor, operating in a stirred, gas-phase mode using a 160 g NaCl seed bed, a total pressure of 200 psig, an operating temperature of 90° C. and a polymerization feed composition consisting of 96 mole percent ethylene and 4 mole percent 1-butene. During the polymerization the feed gas mixture was continuously introduced into the reactor, on demand, to maintain the operating pressure of 200 psig. Polymerizations were conducted for a period of 1 hour.

Example 4

The polymerization reactor and NaCl seed bed were conditioned by heating the reactor to 110° C. under nitrogen and stirring for 20 minutes. The reactor was then vented and put under vacuum for 20 minutes. Once conditioning was completed, temperature was reduced to 50° C. and nitrogen was added to bring the reactor to atmospheric pressure. 0.26 mL of a 25 weight % solution of tri-isobutylaluminum (TiBAL), in heptane was introduced into the reactor. The reactor temperature was raised to 90° C. and 100 psi of the ethylene/butene mixture was added to the reactor. 9 mg of Catalyst A (Example 1) was then added to the reactor as a powder pushed by an additional 100 psi of the ethylenel-butene mixture to bring the reactor to the operating pressure of 200 psig and initiate polymerization. Polymer yield and related polymerization data are summarized in Table 2. No reactor fouling was observed.

Examples 5–10

Examples 5 through 10 were conducted according to the procedure outlined in Example 4 using the materials and quantities specified in Table 2. Polymerization yields, activities and productivities for these examples are presented in Table 2. No reactor fouling was observed.

TABLE 2

Polymerization Data

| Example | 4 | 5 | 6 | 7 | 8 | 9 | 10 |
|---|---|---|---|---|---|---|---|
| Catalyst | A | A | B | B | B | C | C |
| Catalyst Wt (mg) | 9 | 9 | 10 | 9 | 9 | 10 | 11 |
| 25 Wt % TiBAL (mL) | 0.26 | 0.26 | 0.26 | 0.28 | 0.28 | 0.28 | 0.29 |
| Polymer Yield (g) | 37.0 | 35.8 | 63.2 | 52.8 | 50.8 | 0.3 | 0 |
| Catalyst Activity[a] | 232.2 | 224.7 | 357.0 | 331.5 | 318.8 | 3.1 | 0 |
| Catalyst Productivity[b] | 4110 | 3978 | 6319 | 5867 | 5643 | 29 | 0 |
| Mw (x $10^{-3}$ g/mol) | — | 538.7 | 508.6 | — | — | — | — |
| Mw/Mn (Polydispersity) | — | 2.06 | 2.56 | — | — | — | — |

[a]Activity was measured as kg(polymer)/mmol Ti.[$C_2^-$].hr, where [$C_2^-$] is the calculated molar concentration of ethylene adsorbed into the polymer particles under the reaction conditions.
[b]Productivity was measured as g(polymer)/g(catalyst).
* For clarity, this catalyst is further described with reference to the earlier description given in the disclosure, as follows. The "Cp" ligand referred to in the description is indenyl. The "Pl" ligand is tri-tertiary butyl phosphinimine (i.e. each of the three substituents on the phosphorous atom are tertiary butyl groups). Thus, this catalyst has one indenyl ligand; one tri-(tertiary butyl) phosphinimine ligand and two chloride ligands bonded to the titanium metal.

What is claimed is:

1. A heterogeneous olefin polymerization catalyst composition comprising:
   (a) an organometallic complex is defined by the formula:

wherein M is a metal selected from the group consisting of titanium, zirconium and hafnium; Cp is a cyclopentadienyl group containing ligand selected from the group consisting of unsubstituted cyclopentadienyl; substituted cyclopentadienyl; unsubstituted indenyl and substituted indenyl; and each X is independently selected from the group consisting of a 1) hydrogen atom, 2) a halogen atom, 3) a $C_{1-10}$ hydrocarbyl radical, 4) a $C_{1-10}$ alkoxy radical, 5) a $C_{1-10}$ aryl oxide radical; each of which said hydrocarbyl, alkoxy, and aryl oxide radicals is unsubstituted or substituted by a substituent selected from the group consisting of a halogen atom, a $C_{1-8}$ alkyl radical, a $C_{1-8}$ alkoxy radical, a $C_{6-10}$ aryl and aryl oxy radical, 6) an amido radical which is unsub- stituted or substituted by up to two $C_{1-8}$ alkyl radicals; and 7) a phosphido radical which is unsubstituted or substituted by up to two $C_{1-8}$ alkyl radicals; and Pl is a phosphinimine ligand defined by the formula:

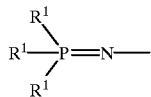

wherein each $R^1$ is independently selected from the group consisting of 1) a hydrogen atom, 2) a halogen atom, 3) $C_{1-20}$ hydrocarbyl radicals which are unsubstituted or substituted by a substituent selected from the group consisting of a halogen atom, 4) a $C_{1-8}$ alkoxy radical, 5) a $C_{6-10}$ aryl or aryloxy radical, 6) a silyl radical of the formula:

wherein each $R^2$ is independently selected from the group consisting of hydrogen, a $C_{1-8}$ alkyl or alkoxy radical, 7) $C_{6-10}$ aryl or aryloxy radicals, 8) an amido radical of the formula:

wherein $R^2$ is as defined above, and 9) a germanyl radical of the formula:

wherein $R^2$ is as defined above;
   (b) an activator; and
   (c) a hydrotalcite which has been dried of physically adsorbed moisture and is defined by the formula:

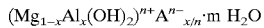

wherein $0<x\leq 0.5$; m is a positive number, and $A^{n-}$ is an anion having a charge of n wherein n is 2 or 3.

2. The catalyst composition according to claim 1 wherein A is selected from the group consisting of $CO_3$, $PO_4$ and $SO_4$.

3. The catalyst composition according to claim 1 wherein said hydrotalcite is a magnesium-aluminum hydroxy carbonate.

4. The catalyst composition according to claim 3 wherein said magnesium-aluminum hydroxy carbonate has a particle size of less than 5 microns.

5. The catalyst composition according to claim 1 wherein said phosphinimine ligand is tri-(tertiary butyl) phosphinimine.

6. The catalyst composition according to claim 1 wherein said activator is methylalumoxane.

7. A process to prepare a spray dried olefin polymerization catalyst, said process consisting of:
   I) providing a mixture of:
      (a) an organometallic complex is defined by the formula:

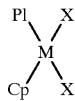

wherein M is a metal selected from the group consisting of titanium, zirconium and hafnium; Cp is a cyclopentadienyl group containing ligand selected from the group consisting of unsubstituted cyclopentadienyl; substituted cyclopentadienyl; unsubstituted indenyl and substituted indenyl; and each X is independently selected from the group consisting of 1) a hydrogen atom, 2) a halogen atom, 3) a $C_{1-10}$ hydrocarbyl radical, 4) a $C_{1-10}$ alkoxy radical, 5) a $C_{5-10}$ aryl oxide radical; each of which said hydrocarbyl, alkoxy, and aryl oxide radicals is unsubstituted or substituted by a substituent selected from the group consisting of a halogen atom, a $C_{1-8}$ alkyl radical, a $C_{1-8}$ alkoxy radical, a $C_{6-10}$ aryl and aryl oxy radical, 6) an amido radical which is unsubstituted or substituted by up to two $C_{1-8}$ alkyl radicals; and 7) a phosphido radical which is unsubstituted or substituted by up to two $C_{1-8}$ alkyl radicals; and Pl is a phosphinimine ligand defined by the formula:

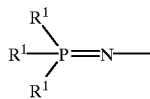

wherein each $R^1$ is independently selected from the group consisting of 1) a hydrogen atom, 2) a halogen atom, 3) $C_{1-20}$ hydrocarbyl radicals which are unsubstituted by or further substituted by a halogen atom, 4) a $C_{1-8}$ alkoxy radical, 5) a $C_{6-10}$ aryl or aryloxy radical, 6) a silyl radical of the formula:

wherein each $R^2$ is independently selected from the group consisting of hydrogen, a $C_{1-8}$ alkyl or alkoxy radical, 7) $C_{6-10}$ aryl or aryloxy radicals, 8) an amido radical of the formula:

wherein $R^2$ is as defined above, and 9) a germanyl radical of the formula:

wherein $R^2$ is as defined above.
   (b) an activator;
   (c) a hydrotalcite which has been dried of physically adsorbed moisture and is defined by the formula:

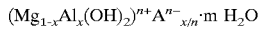

wherein $0<x \leq 0.5$; m is a positive number, and $A^{n-}$ is an anion having a charge of n wherein n is 2 or 3; and
   (d) a diluent; and
   II) spray drying said mixture.

8. The process according to claim 7 wherein said phosphinimine ligand is tri-(tertiary butyl) phosphinimine.

9. The process of claim 7 wherein A is selected from the group consisting of $CO_3$, $PO_4$ and $SO_4$.

10. The process according to claim 9 wherein said hydrotalcite is a magnesium-aluminum hydroxy carbonate.

11. The process according to claim 10 wherein said magnesium-aluminum hydroxy carbonate has a particle size of less than 5 microns.

12. The process according to claim 7 wherein said activator is methylalumoxane.

* * * * *